July 28, 1942.   J. H. GRAFF   2,290,874
ADJUSTABLE CAMERA SUPPORT
Filed June 4, 1941   2 Sheets-Sheet 1
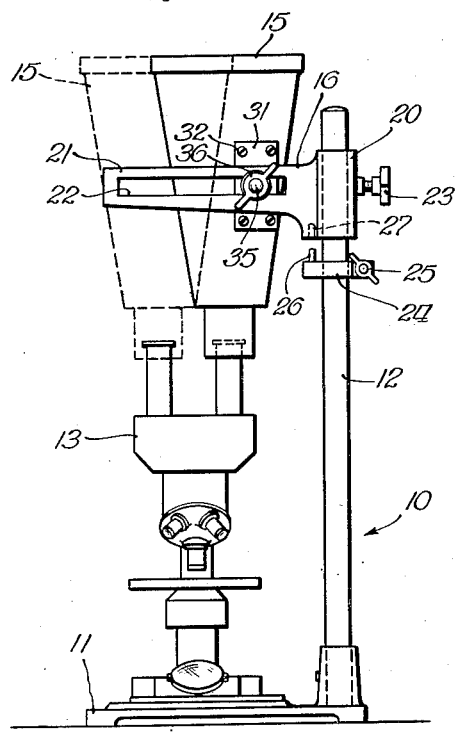
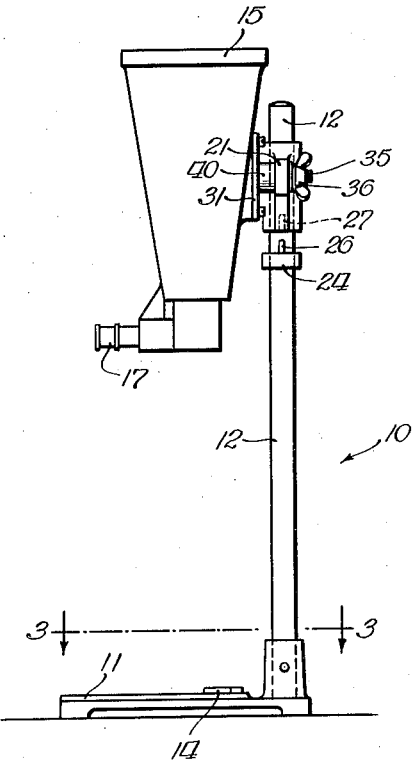
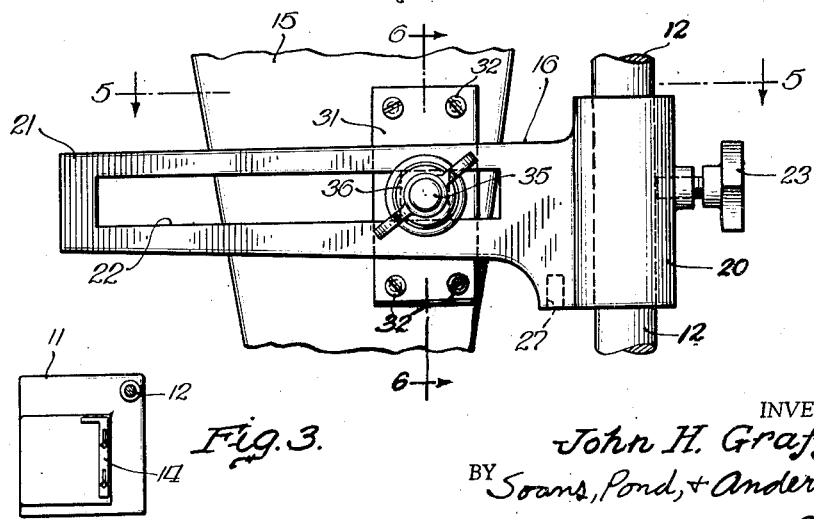
INVENTOR.
John H. Graff
BY Soans, Pond, + Anderson
Attys.

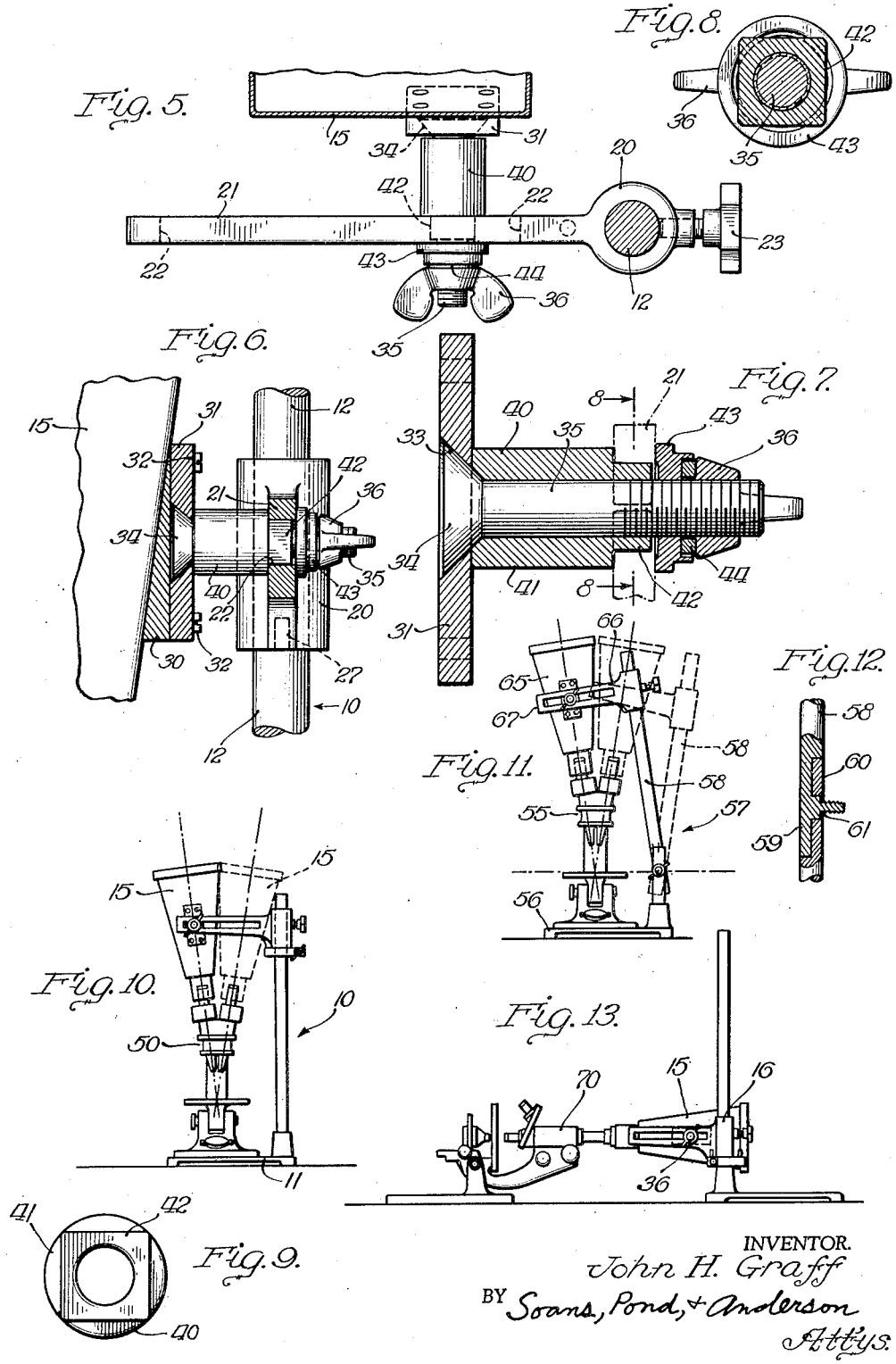

Patented July 28, 1942

2,290,874

UNITED STATES PATENT OFFICE 2,290,874

ADJUSTABLE CAMERA SUPPORT

John H. Graff, Appleton, Wis., assignor to The Institute of Paper Chemistry, a corporation of Wisconsin Application June 4, 1941, Serial No. 396,491

9 Claims. (Cl. 88—24)

My invention relates, generally, to means for supporting cameras and like instruments, and it has particular relation to adjustably supporting cameras for taking photomicrographs.

In making stereophotomicrographs, some type of binocular microscope is used and separate photomicrographs are taken from the two eyepieces. The principle of the binocular microscope is to view the specimen from different angles so that it may be seen in three dimensions. That is, the element of depth is obtained. Stereophotomicrographs are particularly desirable for certain types of work and investigations, and this type of photomicrography has been practiced for many years. Several different methods in technique for taking the stereophotomicrographs have been developed.

In one arrangement, the body tube part of a Greenough microscope is replaced with a special type of camera having two screens and plates mounted in the rear or wide end thereof. This arrangement permits the two photomicrographs to be taken simultaneously in one exposure. It will be seen that in effect, this arrangement amounts to a double camera. This particular type of camera is expensive and means an additional piece of equipment which has no other use in the laboratory. Furthermore, its use requires the microscope to be modified by removing the body tube section and eyepieces thereof. When it is desired to use the microscope for ordinary observation work, the double camera must be removed and the body tube and eyepieces replaced. This changing over of the microscope involves considerable inconvenience as can be readily seen.

In a second technique a photomicrographic camera is clamped directly to the tubes of the binocular microscope. Although in this arrangement the adjustment of the microscope and realignment of the optical system and illuminant is not required, the support is unstable and is generally unsatisfactory.

In a third technique, which is the one ordinarily used, a binocular microscope is set on the base of a camera support and a camera is adjusted over one of the eyepieces thereof. After proper alignment of the microscope and illuminant, the first exposure is taken. The microscope is then turned around 180° so that the other eyepiece is placed under the camera and after realignment of the microscope and illuminant the second exposure is taken. Care must be taken in turning the microscope around that the specimen is not displaced. This shifting of the microscope is objectionable since the alignment of the microscope and illuminant is upset and must be remade, all of which is time taking and conducive to error.

A fourth little used technique of obtaining photomicrographs may be mentioned which involves certain ingenious arrangements in using an ordinary single eyepiece microscope. These arrangements are complicated and involve considerable skill to obtain a satisfactory result. This technique was formerly used where a binocular microscope was not available.

Accordingly, it will be apparent that there is a considerable present need of an adjustable camera support arrangement whereby an ordinary photomicrographic camera may be adjustably shifted and supported in turn over each of the eyepieces of a binocular microscope in a steady rigid manner for taking the separate photomicrographs without the necessity of shifting the microscope and realigning the light and condenser system for each exposure.

The object of this invention, generally stated, is to provide an adjustable camera support whereby a photomicrographic camera may be supported over the eyepieces of a binocular microscope for taking the separate photomicrographs in stereophotomicrographic work without having to disturb the microscope adjustment or alignment of the illumination. The adjustable camera support of the invention may be used with a one-objective binocular microscope having parallel eyepieces, or with a two-objective binocular microscope of the Greenough type having divergent eyepieces.

An important object of the invention is the provision of an improved clamping arrangement whereby in the single tightening action of one nut a camera may be secured in any particular upright or tilted position and in any particular position on a bracket arm. By untightening the same nut the camera may be tilted to any other position and shifted to different positions on the bracket arm.

For a more complete understanding of the nature and scope of my invention, reference may now be had to the following detailed description thereof taken in connection with the acompanying drawings, in which:

Fig. 1 is an elevational view showing one embodiment of the adjustable camera support for supporting a camera over the eyepieces of a one-objective binocular microscope;

Fig. 2 is an elevational view taken from the left hand side of Fig. 1 with the microscope removed;

Fig. 3 is a sectional view taken on line 3—3 of Fig. 2;

Fig. 4 is an enlarged fragmentary side elevational view showing the adjustable camera support of Figs. 1 and 2;

Fig. 5 is a sectional view taken on lines 5—5 of Fig. 4;

Fig. 6 is a vertical sectional view taken on lines 6—6 of Fig. 4;

Fig. 7 is a vertical sectional view showing the details of the adjustable clamping support shown in Figs. 4, 5, and 6;

Fig. 8 is a sectional view taken on line 8—8 of Fig. 7;

Fig. 9 is a right end elevational view of the collar member of Fig. 7 forming one of the elements of the clamping support arrangement;

Fig. 10 is an elevational view illustrating the manner in which the adjustable clamping support illustrated in Figs. 1 through 9 which may be used to support a camera over either eyepiece of a two-objective binocular microscope of the Greenough type having divergent eyepieces;

Fig. 11 is an elevational view showing an alternate form of camera support arrangement for supporting a camera over either eyepiece of a Greenough type binocular microscope;

Fig. 12 is a fragmentary broken away view showing the details of the pivot joint of the support post in Fig. 11; and Fig. 13 is an elevational view showing the manner in which the adjustable camera support illustrated in Figs. 1 through 10 of the drawings may be used for supporting a camera for ordinary photomicrography with the microscope in a horizontal position.

Referring to Figs. 1 and 2 of the drawings, a camera support stand is indicated generally at 10 comprising a base 11 and an upright post 12. A binocular microscope 13 of the mono-objective type fits on the base 11. The right angle cleat 14, Fig. 3, serves to hold the microscope 13 in position. A conventional photomicrographic camera 15 of the single plate type is adjustably mounted over the microscope 13 from a supporting bracket 16. The camera 15 has an observation tube 17, Fig. 2, which extends at right angles to the optical axes of the microscope.

The bracket 16 comprises a sleeve portion 20 which is carefully fitted to the smooth rod 12 of the stand 10, and a projecting arm 21 having a slot 22 formed longitudinally therein. A thumb or set screw 23 is provided in the side of the sleeve 20 which serves to rigidly secure the bracket 16 in a fixed position on the rod 12. The bracket 16 may be further secured in the position and supported by a two-part adjustable stop 24 slidable on the rod 12 underneath the sleeve 20. The stop 24 has a wing nut 25 whereby it may be tightly clamped in any desired position, and has a projecting pin 26 adapted to fit in a corresponding recess 27 in the base of the sleeve 20. The adjustable stop 24 with the projecting pin 26 permits the bracket 16 to be raised from a fixed position and then returned thereto.

The details of the clamping support arrangement whereby the camera 15 is supported from the bracket arm 21 are shown in more detail in Figs. 4 through 9 of the drawings. Referring to these figures of the drawings and particularly Figs. 6 and 7, it will be seen that the sloping or tapered side of the camera 15 has a wedge-shaped cleat 30 secured to the side thereof so as to provide a vertical side to which a rectangular cleat or plate 31 may be fastened by four screws 32. The cleat 31 has a hole or aperture 33 formed therein shaped to accurately conform to the truncated conical shape of the head 34 of a bolt 35. It will be understood that certain other shaped bolt heads and corresponding holes may be used. The bolt 35 with a small part of the head 34 projects through the opening in the cleat 31 and its shank extends at right angle through the slot 22 in the bracket arm 21. The end of the bolt 35 which projects through the arm 21 on the opposite side from the camera 15 is threaded so as to accommodate a tightening wing nut 36.

The camera 15 is spaced from the bracket arm 21 by a two-section collar 40 within which the bolt 35 is slidable. One section of the collar 40 comprises a cylindrical collar portion 41 fitting in between the cleat 31 and the side of the bracket arm 21. The end of the collar section 41 fitting against the cleat 31 is reamed or counterbored so as to receive a small portion of the bolt head 34 as shown in Fig. 7. The collar portion 41 is of such a diameter and size that it will not pull through the slot 22 in the arm 21. The other section or portion of the collar 40 consists of a square-sided portion 42 integrally formed with the cylindrical collar portion 41 and fitting in the slot 22 in the arm 21. The dimensions of the square-sided portion 42 are such that it is easily slidable in the slot 22 without objectionable play. The thickness or length of the square section 42 is somewhat less than the thickness of the arm 21 as shown, so that it cannot project completely through the slot 22 when the collar 41 is fitting against the side of the arm 21. This permits the collar 40 to be drawn up tightly against the side of the bracket arm 21.

In order to hold the part of the clamping arrangement in locked position when drawn up together and to permit the easy loosening thereof, a lock washer assembly is provided between the wing nut 36 and the side of the bracket arm 21. This comprises a washer 43 having a wide face which fits against the arm 21 and a recess in the opposite face for retaining a lock washer 44. Although it is not essential that this lock washer 44 be provided it is desirable to include this element.

The operation of the clamping operation is effected by the single tightening and untightening action of the wing nut 36. When the wing nut 36 is loosened the cleat 31, collar 40, bolt 35 and the arm 21 are all movable relative to each other. The camera 15 and the cleat 31 fastened to the sides thereof may be rotated in any desired position and angle about the bolt head 34 and the assembly may be moved to various positions along the bracket arm 21 in the slot 22. Thus, the camera 15 is adjustable to any angular position about the axis of the bolt 35 and is adjustable in various positions along the side of the bracket arm 21.

When the wing nut 36 is tightened, the elements making up the clamping arrangement are drawn up together. The bolt 35 is drawn in toward the bracket arm so that the bolt head 34 acts to wedge the cleat 31 in between the sides of the bolt head and the end of the collar 40 fitting against the cleat. Thus, the camera 15 and cleat 31 are secured in position and prevented from being rotated or tilted. The tightening action also draws the collar 40 at the shoulder between the cylindrical section 41 and the square section 42 firmly against the side of the bracket arm 21 so as to secure the assembly from being slid or moved in the slot 22. The square section 44 serves to prevent rotation of the collar 40 while maintaining its alignment in the slot 22. It will be seen then that in the single tightening action of the nut 36, the camera 15 is held against rotation and secured in a fixed position on the side of the bracket arm 21.

The manner in which the clamping arrangement permits the adjustable support of a camera for taking the separate photomicrographs for stereophotomicrography may be understood on again referring to Fig. 1 of the drawings. The specimen to be examined is properly mounted on the stage of the microscope 13 and the microscope is adjusted and focused thereon. The illuminant (not shown) for the specimen is properly aligned so that the specimen is well lighted. The photomicrographic camera 15 is then adjusted over one of the eyepieces of the microscope, for example, the right hand eyepiece as shown in Fig. 1. The adjustment is made with the clamping arrangement loosened whereby the axis of the camera may be properly aligned with the axis of the eyepiece. The adjustable stop 24 is then placed tightly beneath the bracket sleeve 20 and with the camera 15 properly focused one photomicrograph is taken. The set screw 23 is loosened so that the bracket 16 and camera 15 may be raised to clear the right hand eyepiece and the clamping arrangement is loosened so that the camera 15 may be moved to the left over the left hand eyepiece as shown in broken outline. The bracket is then set down on the stop 24 and the set screw 23 tightened so as to eliminate any play or motion between the sleeve 20 and the rod 12. The camera 15 is then adjusted over the left hand eyepiece and focused so as to obtain the second photomicrograph.

It will be seen that my adjustable camera support arrangement permits the separate exposures to be taken without moving the microscope thereby eliminating the necessity of realigning the microscope and illuminant. Likewise, shifting of the specimen in moving the microscope is eliminated. Perfect alignment of the exposures is permitted with the improved clamping support arangement.

The same clamping arrangement as described above may be used for adjustably supporting a camera to take the separate photomicrographs with a binocular microscope of the Greenough type having divergent eyepieces, as shown in Fig. 10 of the drawings. The Greenough microscope 50 is mounted on the base 11 of the camera stand 10. The photomicrographic camera 15 may be first supported over the left hand eyepiece as shown. The adjustment of the support of the camera 15 is made with the clamping arrangement loosened so that the axis of the camera may be aligned with that of the eyepiece. The clamping arrangement is then tightened and with the camera 15 focused the first photomicrograph is taken. The clamping arrangement and bracket are then loosened and the camera 15 is placed over the right hand eyepiece as indicated in broken outline. The position of the camera 15 over the right hand eyepiece is adjusted and the clamping arrangement is tightened so that the second exposure may be taken. It will be noted, the two separate exposures are thus taken without realigning the microscope and the illuminant and without shifting the position of the microscope 50. The advantages of being able to take the separate photomicrographs without shifting the microscope and realigning the condenser and light systems for each exposure have been described above.

A modified embodiment of the invention is shown in connection with Figs. 11 and 12 of the drawings for adjustably supporting a camera to take separate photomicrographs with a Greenough binocular microscope. A Greenough microscope is set on the base 56 of a camera support stand indicated generally at 57 having a supporting rod or post 58. A pivot joint is provided in the post 58 adjacent to the lower end thereof with the pivotal axis thereof at substantially the same height or level as the optical plane of observation of the microscope 55. The two optic axes of the microscope 55 intersect at a point in this optical plane. The pivot joint is shown in Fig. 12 and is of conventional design. The interfitting sections of the post 58 are halved as shown at 59 and 60, with an integral journal 61 projecting from the section 59 through a carefully fitted hole in the half section 60. The journal 61 does not project entirely through the side of section 60 and a wing nut may be used to draw up the sections 59 and 60 together so as to hold the post 58 in any desired tilted position.

A photomicrographic camera 65 is adjustably supported from a bracket 66 secured on the post 58. The camera 65 may be mounted on one side of the bracket arm 67 in a fixed position with its vertical axis parallel with the post 58. The clamping arrangement as described above in connection with Figs. 4 through 9 may be used to support the camera 65 and left in tightened condition or a rigid non-adjustable support may be used. The camera 65 is supported over the left hand eyepiece of the microscope 55 as shown in Fig. 11, the post 58 is secured in a position which is parallel with the optic axis through the left hand eyepiece and the left hand objective associated therewith and the bracket 66 is adjusted so that the camera 65 fits over this eyepiece. The first exposure is then taken after which the bracket 66 is raised and the post 58 tilted to the right to a position parallel with the optic axis through the right hand eyepiece and the right hand objective. This alternate position of the post 58 and camera 65 is shown in broken outline. The camera 65 is then lowered in position over the right hand eyepiece and the second exposure is taken.

Since the pivot point of the support post 58 is at the same level as the point of intersection of the two optical axes of the microscope 55, it is not necessary to shift the position of the camera 65 on the bracket arm 67. That is, in the two positions shown for taking the micrograph over the two eyepieces of the microscope 55, the distances between the vertical axis of the camera and the axis of the support post 58 are the same in both instances.

The first embodiment of my invention described in connection with Figs. 1 to 10 of the drawings may also be used conveniently for ordinary photomicrography with the microscope either in a vertical or horizontal position. In Fig. 13 of the drawings one such arrangement is shown with a conventional one-eyepiece microscope 70 turned to a horizontal position. The photomicrographic camera 15 is turned on the side of the bracket 15 to a nearly horizontal position so that the axes of the camera may be aligned with the optical axes of the microscope 70. The wing nut 36 is then tightened so as to secure the camera 15 in position. Although the advantages of the improved clamping arrangement may not be so important in the arrangement shown in Fig. 13 as those described above in connection with taking the separate exposures for stereophotomicrography with the two types of binocular microscopes, it does serve to illustrate the general adaptability of the arrangement for all types of photomicrographic work. This is an important factor since it is desirable both from the standpoint of convenience and expense to keep the amount of laboratory equipment and accessories down to a minimum.

Since certain changes may be made in the foregoing constructions and different embodiments of the invention may be made without departing from the scope thereof, it is intended that all matter described hereinbefore or shown in the accompanying drawings shall be interpreted as illustrative and not in a limited sense.

I claim as my invention:

1. Means for securing an object in either a tilted or upright position about one axis while simultaneously securing its disposition along a second axis by a single tightening action which comprises, in combination, a bracket having a projecting arm with a slot formed therein, a bolt extending crosswise through said slot, a bolt head formed on one end of said bolt and threads cut on the opposite end thereof, a cleat fastened to said object having an aperture formed therein in which said bolt head is disposed and through which the bolt projects, the aperture being so shaped that the bolt head will not pull therethrough, a collar slidably fitting over the shank of said bolt and in between said cleat and said bracket arm, said collar being of such size that it will not pull through said slot, and a nut on the threaded end of said bolt adapted to be tightened thereon, said object being tiltable and said bolt being slidable in said slot when said nut is in loosened condition, and said bolt, cleat and collar being drawn up together so as not to be relatively movable with each other or with said bracket arm when said nut is in tightened condition whereby said object is simultaneously held against turning and secured in a fixed position along said bracket arm.

2. Means for securing a camera in either an upright or tilted position about one axis, while simultaneously securing its disposition along a second axis by a single tightening action which comprises, in combination, a bracket having a projecting arm with a slot formed therein, a bolt extending crosswise through said slot, a bolt head formed on one end of said bolt and threads cut on the opposite end thereof, a cleat fastened to the camera, said cleat having an aperture formed therein in which said bolt head is disposed and through which the bolt projects the aperture being of such size and shape that the bolt head will not pull therethrough, a collar slidably fitting over the shank of said bolt and in between said cleat and said bracket arm, said collar being of such size that it will not pull through said slot, and a nut on the threaded end of said bolt adapted to be tightened on one side of said arm, said camera and cleat being turnable and said bolt being slidable in said slot when said nut is in loosened condition, and said elements of the adjustable camera support being drawn up together when said nut is in tightened condition whereby said camera is held against turning and said bolt is simultaneously secured in fixed position in said slot.

3. Means for securing a camera in either an upright or tilted position about one axis, while simultaneously securing its disposition along a second axis by a single tightening action which comprises, in combination, a bracket having a projecting arm with a slot formed therein, a bolt extending through said slot at right angles to said arm, a bolt head formed on one end of said bolt and threads cut on the opposite end thereof, a cleat fastened to the side of the camera, said cleat having an aperture formed therein in which said bolt head is disposed and through which said bolt projects, a collar member slidably fitting over the bolt shank having one section fitting in between said cleat and said bracket arm and of such size that it will not pull through said slot and having another section which is flat-sided and fits in said slot, said flat-sided section having a length less than the thickness of said arm whereby it does not extend completely through said slot and having a pair of opposite parallel flat sides spaced apart a distance equal to the width of said slot whereby it is not turnable therein but is slidable therein, and a nut on the threaded end of said bolt adapted to be tightened on one side of said arm, said camera and cleat being turnable on said bolt head and said bolt being slidable in said slot when said nut is in loosened condition, and said bolt, cleat, collar member, being drawn up together so as not to be relatively movable with each other or with said bracket arm when said nut is in tightened condition whereby said camera is simultaneously held against turning and secured in a fixed position along said bracket arm.

4. Means for securing a camera in either an upright or tilted position about one axis, while simultaneously securing its disposition along a second axis by a single tightening action which comprises, in combination, a bracket having a projecting arm with a slot extending lengthwise therein, a bolt disposed through said slot at right angles to said arm, a bolt head shaped in the form of a truncated cone formed on one end of said bolt with the small face thereof connected with the shank of the bolt, threads cut on the opposite end of the bolt, a cleat fastened to the side of the camera, said cleat having a truncated conically shaped aperture formed therein corresponding in shape to the bolt head and in which the bolt head is disposed and through which said bolt projects, a two-section collar member slidably fitting over the bolt shank and having one section fitting in between said cleat and said bracket arm and of such size that it will not pull through said slot, and the other section being squared off on the sides and fitting in said slot, said square section having a length less than the thickness of said arm whereby it does not extend completely therethrough and the distance between the opposite sides being about equal to the width of said slot whereby it is not turnable therein but is slidable therealong, a nut on the threaded end of said bolt, and a lock washer in between said bracket arm and said nut, said camera and cleat being turnable on said bolt head and said bolt and said square section of the collar being slidable in said slot when said nut is in loosened condition, and, said cleat being wedged in between said bolt head and the adjacent end of said collar, and the other end of said collar being held against said arm when said nut is tightened against said lock washer whereby said camera is simultaneously held against turning and secured in a fixed position along said bracket arm.

5. Means for adjustably supporting a camera over the eyepieces of a binocular microscope so as to take photomicrographs from each eyepiece without disturbing the alignment of the microscope or the illuminant between individual exposures, comprising, in combination, an upright post, a bracket having a sleeve portion slidable on said post and a horizontal arm portion projecting therefrom, means for adjustably securing the bracket at different heights on said post, said arm having a slot extending lengthwise therein, a bolt extending crosswise through said slot, a bolt head formed on one end of said bolt and threads cut on the opposite end thereof, a cleat fastened to the camera, said cleat having an aperture formed therein in which said bolt head is disposed and through which the bolt projects, a collar slidably fitting over the shank of said bolt and in between said cleat and said bracket arm, said collar being of such size that it will not pull through said slot, a flat-sided portion around the bolt at the section thereof in said slot, said flat-sided portion having a thickness less than that of said arm whereby it does not extend completely through said slot and said flat-sided portion having a pair of opposite parallel flat sides spaced apart a distance somewhat less than the width of said slot whereby it is not turnable therein but is slidable therein, and a nut on the threaded end of said bolt adapted to be tightened on one side of said arm, said camera and cleat being turnable and said bolt being slidable in said slot when said nut is in loosened condition, and said elements of the adjustable camera support being drawn up together when said nut is in tightened condition whereby said camera is held against turning and said bolt is simultaneously secured in fixed position in said slot.

6. Means for adjustably supporting a camera over the eyepieces of a binocular microscope so as to take photomicrographs from each eyepiece without disturbing the alignment of the microscope or the illuminant between individual exposures, comprising, in combination, an upright post, a bracket having a sleeve portion slidable on said post and a horizontal arm portion projecting therefrom, means for adjustably securing the bracket at different heights on said post, said arm having a slot extending lengthwise therein, a bolt disposed through said slot at right angles to said arm, a bolt head shaped in the form of a truncated cone formed on one end of said bolt with the small face thereof connected to the shank of the bolt, threads cut on the opposite end of said bolt, a cleat fastened to the side of the camera, said cleat having a truncated conically shaped aperture formed therein corresponding in shape to the bolt head and in which the bolt head is disposed and through which said bolt projects, a two-section collar member slidably fitting over the bolt shank and having one section fitting in between said cleat and said bracket arm and of such size that it will not pull through said slot, and the other section being squared off on the sides and fitting in said slot, said square section having a length less than the thickness of said arm whereby it does not extend completely therethrough and the distance between the opposite sides being about equal to the width of said slot whereby it is not turnable therein but is slidable therealong, a nut on the threaded end of said bolt, and a lock washer in between said bracket arm and said nut, said camera and cleat being turnable on said bolt head and said bolt and said square section of the collar being slidable in said slot when said nut is in loosened condition, and said cleat being wedged in between said bolt head and the adjacent end of said collar, and the other end of said collar being held against said arm when said nut is tightened against said lock washer whereby said camera is simultaneously held against turning and secured in a fixed position along said bracket arm.

7. Means for adjustably supporting a camera over each eyepiece of a binocular microscope having diverging eyepieces so as to take photomicrographs from each eyepiece without disturbing the alignment of the microscope or the illuminant between individual exposures, comprising, in combination, an upright post, a bracket having a sleeve portion slidable on said post and a horizontal arm portion projecting therefrom, means for adjustably securing the bracket a different height on said post, said arm having a slot extending lengthwise therein, a bolt disposed through said slot at right angles to said arm, a bolt head shaped in the form of a truncated cone formed on one end of said bolt with the small face thereof connected to the shank of the bolt, threads cut on the opposite end of said bolt, a cleat fastened to the side of the camera, said cleat having a truncated conically shaped aperture formed therein corresponding in shape to the bolt head and in which the bolt head is disposed and through which said bolt projects, a two-section collar member slidably fitting over the bolt shank and having one section fitting in between said cleat and said bracket arm and of such size that it will not pull through said slot, and the other section being squared off on the sides and fitting in said slot, said square section having a length less than the thickness of said arm whereby it does not extend completely therethrough and the distance between the opposite sides being about equal to the width of said slot whereby it is not turnable therein but is slidable therealong, a nut on the threaded end of said bolt, and a lock washer in between said bracket arm and said nut, said camera and cleat being turnable on said bolt head and said bolt and said square section of the collar being slidable in said slot when said nut is in loosened condition, and said cleat being wedged in between said bolt head and the adjacent end of said collar, and the other end of said collar being held against said arm when said nut is tightened against said lock washer whereby said camera is simultaneously held against turning and secured in a fixed position along said bracket arm.

8. Means for adjustably supporting a camera over each eyepiece of a binocular microscope having diverging eyepieces so as to take photomicrographs from each eyepiece without disturbing the alignment of the microscope or the illuminant between individual exposures, comprising, in combination, a base on which the microscope may be placed, a post upstanding from said base having a pivot joint therein above the level of said base, means for tightening said pivot joint so as to secure said post at different angles with the horizontal, a bracket having a sleeve portion slidable on said post and a projecting arm portion, means for adjustably securing said bracket at different heights on said post, and means for adjustably supporting the camera at different points from said bracket arm.

9. Means for adjustably supporting a camera over each eyepiece of a binocular two-objective microscope, having diverging eyepieces with the optical axis through one eyepiece and the objective associated therewith intersecting the optical axis through the other eyepiece and the other objective associated therewith at a point in the optical plane of observation, so as to take photomicrographs from each eyepiece without disturbing the alignment of the microscope or the illuminant between individual exposures comprising, in combination, a post, means for pivotally supporting said post in different positions around a pivot point which is substantially level with said point of intersection of said optical axes, and spaced to one side thereof, a bracket having a sleeve portion slidable on said post and an arm portion extending at right angles to said post, means for adjustably securing said bracket at different heights on said post, and means for supporting the camera on said bracket arm at a distance from said post which is equal to the distance between said pivot point and said point of intersection of said optical axes.

JOHN H. GRAFF.